United States Patent Office.

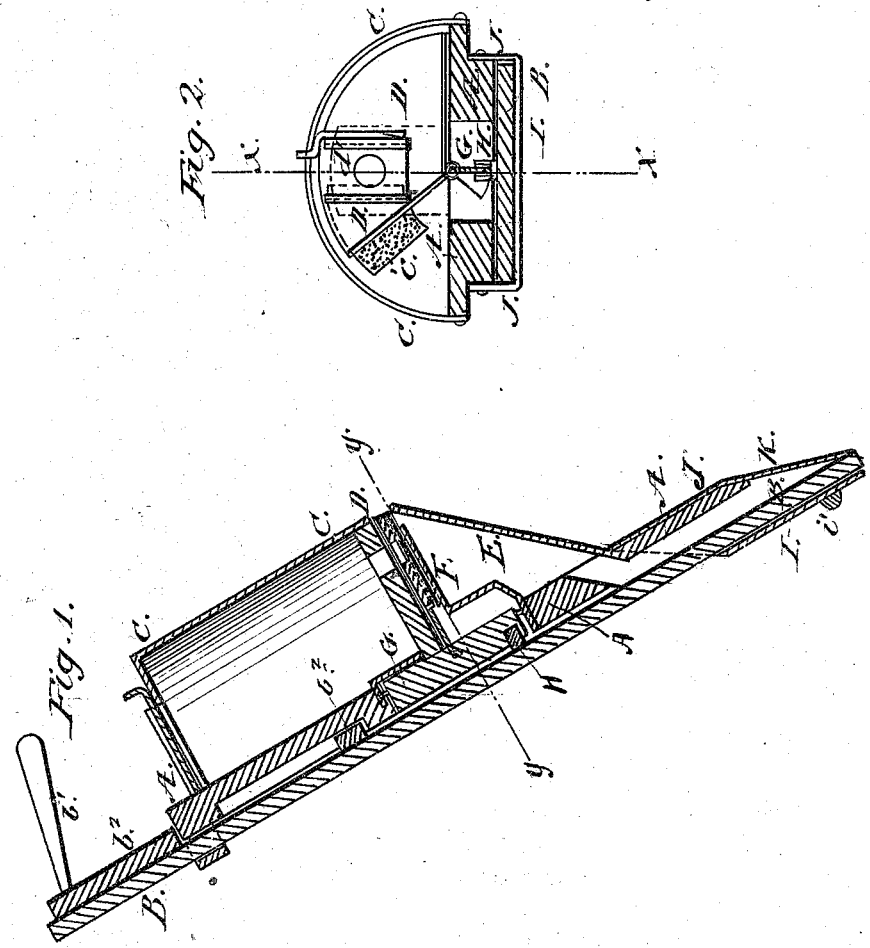
L. O. Hayworth.
Hand Corn Planter
Nº 90,169.  Patented May 18, 1869.
Witnesses:
Oscar Hinchman
Jno. T. Brooks
Inventor:
L. O. Hayworth
per Munn & Co
Attorneys

L. O. HAYWORTH, OF NEW CUMBERLAND, INDIANA.

Letters Patent No. 90,169, dated May 18, 1869.

---

IMPROVEMENT IN HAND CORN-PLANTERS.

---

The Schedule referred to in these Letters Patent and making part of the same.

---

*To all whom it may concern:*

Be it known that I, L. O HAYWORTH, of New Cumberland, in the county of Grant, and State of Indiana, have invented a new and improved Hand Corn-Planter; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my improved hand corn-planter, taken through the line $x\,x$, fig. 2.

Figure 2 is a detail cross-section of the same, taken through the line $y\,y$, fig. 1.

Similar letters of reference indicate corresponding parts.

My invention has for its object to furnish an improved hand corn-planter, simple in construction, easily operated, reliable and accurate in operation, and not liable to get out of order, or to become clogged or choked up; and It consists in the construction and combination of the various parts of the planter, as hereinafter more fully described.

A is the main frame of the machine, along the rear side of which slides the plunger B, to the forward side of the upper end of which is attached a handle, $b^1$, and the movement of which is limited by the stops $b^2$, attached to the said plunger B, and striking against the cross-bar or shoulder $a'$ of the plate or frame A.

C is the seed-box, which is made semi-cylindrical in form, and which is attached to the upper part of the forward side of the plate or frame A, and which has a hole or opening in its upper end, to receive the corn, which opening may be closed with a slide-gate.

The bottom of the box C is made thick, and has a hole in it, for the passage of the corn to the dropping-plate D.

In the bottom of the box C, at the side of the hole in said bottom, is secured a brush, $c'$, which rests upon the dropping-plate D, to prevent the said plate from carrying too many kernels with it to the hopper E.

The dropping-plate D has a hole formed in it, of such a size as to secure the exact number of kernels required for a hill.

The part $d$, in which the hole is formed, is made detachable, so that it may be removed, to be replaced by another with a different-sized hole, according to the size of the kernels, or the number required for a hill.

F is a plate or table, which is attached to frame A, and projects beneath the middle part of the seed-box C, to form a bottom for the hole through the dropping-plate D, while receiving the seed from the seed-hopper, and until said plate has been carried to the proper place for dropping the seed into the hopper E.

The hopper E is so formed as to conduct the seed inward into the channel in the frame A, which conducts it into the lower part of the machine, below the end of the plunger B.

The inner end of the dropping-plate D is rigidly connected to the outer edge of a spiral plate, G, which is pivoted to ears attached to the frame A, and the inner edge of which enters a slot in a stud, H, attached to the plunger B, so that as the plunger B is moved up and down, the dropping-plate D may be moved laterally, to receive the seed from the seed-box C, and convey it to the hopper E.

I is a plate, connected with the frame B by the upwardly-inclined straps J, so that the said plate I may project below the lower end of the frame B, to open the ground to receive the seed.

The plate I may have a stop, $i$, attached to its rear side, to regulate the depth to which it enters the ground.

K is a spring-plate, the upper edge of wnich is attached to the outer side of the lower end of the frame A, and the lower edge of which rests against the forward side of the plate I, closing the opening into the machine while being forced into the ground, and at the same time forming a stop to receive and support the seed until the said plate is forced out by the descending lower end of the plunger B, allowing the seed to drop out into the opening made in the ground.

As the instrument is withdrawn from the ground, the seed is covered by the falling in of the earth.

I claim as new, and desire to secure by Letters Patent—

1. The dropping-plate D, spiral plate G, and slotted stud H, in combination with the seed-box C, table or plate F, frame A, and plunger B, substantially as herein shown and described, and for the purpose set forth.

2. An improved corn-planter, formed by the combination of the frame A, plunger B, seed-box C, dropping-plate D $d'$, brush $c$, table F, spiral plate G, hopper E, plate I, and spring-plate K, with each other, said parts being constructed, arranged, and operating substantially as herein shown and described, and for the purpose set forth.

3. Constructing the dropping-plate D in such a way that it may be held up against the bottom of the seed-box C with an elastic pressure, to facilitate the discharge of any stray kernels that may find their way between the said plate and seed-box, substantially as herein shown and described.

L. O. HAYWORTH.

Witnesses:
HARMAN D. REASONER,
NOAH LYON.